United States Patent [19]
Graham

[11] Patent Number: 4,512,806
[45] Date of Patent: Apr. 23, 1985

[54] FLAME RESISTANT ASHALTIC COMPOSITIONS

[75] Inventor: Joseph Graham, Oakdale, Minn.

[73] Assignee: Minnesota Mining and Manufacturing Company, St. Paul, Minn.

[21] Appl. No.: 446,880

[22] Filed: Dec. 6, 1982

Related U.S. Application Data

[63] Continuation of Ser. No. 206,275, Nov. 12, 1980, abandoned, which is a continuation-in-part of Ser. No. 59,614, Jul. 23, 1979, Pat. No. 4,234,639.

[51] Int. Cl.³ ............................................. C09D 5/18
[52] U.S. Cl. .................................. 106/18.24; 106/16; 106/277; 106/279; 106/281 R; 252/311.5
[58] Field of Search ............... 106/18.24, 18.25, 16, 106/18.35, 278, 277, 281 R; 252/311.5

[56] References Cited

U.S. PATENT DOCUMENTS

| | | | |
|---|---|---|---|
| 2,610,920 | 9/1952 | Hopkinson | 106/18.25 |
| 2,718,479 | 9/1955 | Bierly | 117/168 |
| 3,418,267 | 12/1968 | Busse | 106/18.24 |
| 3,908,068 | 9/1975 | MacKenzie et al. | 106/18.24 |

FOREIGN PATENT DOCUMENTS 1300937 12/1972 United Kingdom .
1457999 12/1976 United Kingdom .

Primary Examiner—Lorenzo B. Hayes
Attorney, Agent, or Firm—Doanld M. Sell; James A. Smith; Roger R. Tamte

[57] ABSTRACT

Asphaltic materials (e.g., asphalt, bitumen, or pitch) are increased in flame-resistance and improved in other useful properties by use of a latent catalyst mixture which reacts upon heating to catalyze oxidation of the asphaltic material. The catalyst comprises halogenated organic compound which decomposes and releases halogen upon heating and an iron-containing compound adapted to react with the released halogen to form iron halide.

20 Claims, 3 Drawing Figures

FLAME RESISTANT ASHALTIC COMPOSITIONS

REFERENCE TO RELATED APPLICATION

This is a continuation of application Ser. No. 206,275 filed Nov. 12, 1980, now abandoned, which is a continuation-in-part of pending application Ser. No. 059,614, filed July 23, 1979, now issued as U.S. Pat. No. 4,234,639.

TECHNICAL FIELD

This invention relates to the catalysis of reactions within asphalt, bitumen, or pitch to modify the flammability and flow properties of those materials.

BACKGROUND ART

Ferric chloride has been used for many years as a catalyst during conversion of petroleum into asphalt to catalyze oxidation of the petroleum molecules to higher-molecular-weight, higher-viscosity forms. Some catalyst typically remains unused at the end of the process, and Tomlinson et al, U.S. Pat. No. 3,332,830 teaches that this retained catalyst is useful to improve the fire-resistance of asphalt-impregnated sheeting made from the asphalt. In the presence of a flame the catalyst causes the asphalt to increase in viscosity and ultimately to char, thereby limiting the flow of asphalt that could contribute to spreading of the flame.

Despite its improved flame resistance, asphalt catalyzed with the retained ferric chloride has limited utility, because reactions are catalyzed in the asphalt prematurely. For example, in the presence of the heat of a manufacturing operation, the ferric chloride catalyzes reactions that thicken the asphalt and make it difficult to impregnate and coat.

British Pat. Nos. 1,300,937 and 1,457,999 do not mention ferric chloride, but they suggest the use of materials that presumably can react to form ferric chloride. Specifically, these patents suggest that compositions of asphalt, bitumen, or pitch be made flame-retardant through the combined use of a halogen donor and a finely divided material that consists of aluminum-iron silicate and/or ferric oxide. The ferric oxide is regarded in the patents as activating or reacting with the halogen donor to enhance the release of halogen or hydrogen halide when the composition is exposed to a flame. The halogen donor may be selected from chlorinated rubber and alkyl benzenes containing two or more chloride and/or bromine atoms as nuclear substituents. The compositions include, per 100 parts of bitumen, pitch, or asphalt, 1–50, preferably 4–10, parts of halogen donor, and 6–20, preferably 8–15, parts of ferric oxide.

The described teachings of the British patents could have only a limited utility, since halogen donors are typically much more expensive than asphalt, e.g., 20 times more expensive than asphalt. The use of 1–50 and preferably 4–10 parts of the halogen donor would greatly increase the cost of asphalt, to a point that it would be impractical for most uses of asphalt.

SUMMARY OF THE INVENTION

The present invention provides a latent catalyst for asphalt, bitumen, or pitch (referred to generally hereafter as "asphalt") which greatly enhances the utility of the asphalt and its flame-retarding ability. Briefly, it has been found that when a mixture comprising (a) 0.1–1 part (parts are by weight unless otherwise stated) of halogenated organic compound that (i) has a molecular weight of at least 300, (ii) includes halogen in an amount of at least 40 weight-percent, and (iii) decomposes to release halogen when heated to a temperature between about 100° C. and 250° C.; (b) at least 0.1 part of iron-containing compound adapted to react with said released halogen to form iron halide; and (c) 100 parts of asphalt is exposed to a flame or other source of heat, the asphalt is catalyzed to cause, in the case of exposure to a flame, charring of the asphalt and inhibition of the flame, or, in the case of exposure to other sources of heat, a desired thickening. Despite the low amount of catalyst distributed in the asphalt, the catalysis is effective to achieve good flame retardation and effective thickening. The low amount of catalyst makes use of the catalyst moderate in cost and increases the opportunities for use of catalyzed asphalt.

Since the halogenated organic compound decomposes at temperatures above 100° C., the catalytic action can be inactive or latent throughout many processing operations for asphalt. The latency of the catalyst opens the way to new procedures for using the asphalt—e.g., lower-viscosity forms can be used for impregnation or coating purposes, and the asphalt later thickened as part of a manufacturing operation, or during use of the coated or impregnated product. Further, in contrast to ferric chloride and phosphoric acid (another catalyst for asphalt), catalysts of the invention can be insensitive to water and therefore can be used as a catalyst in water systems such as asphalt emulsions. Also, flame-retardant products can be conveniently prepared with catalyzed asphalt, which except for the latency of the catalyst of this invention would thicken during an impregnating operation and inhibit impregnation.

BRIEF DESCRIPTION OF THE DRAWINGS

The drawings are contour plots based on tests showing different effects on the softening point of asphalt obtained through the use of catalyst mixtures of the invention.

DETAILED DESCRIPTION

Figure 1:
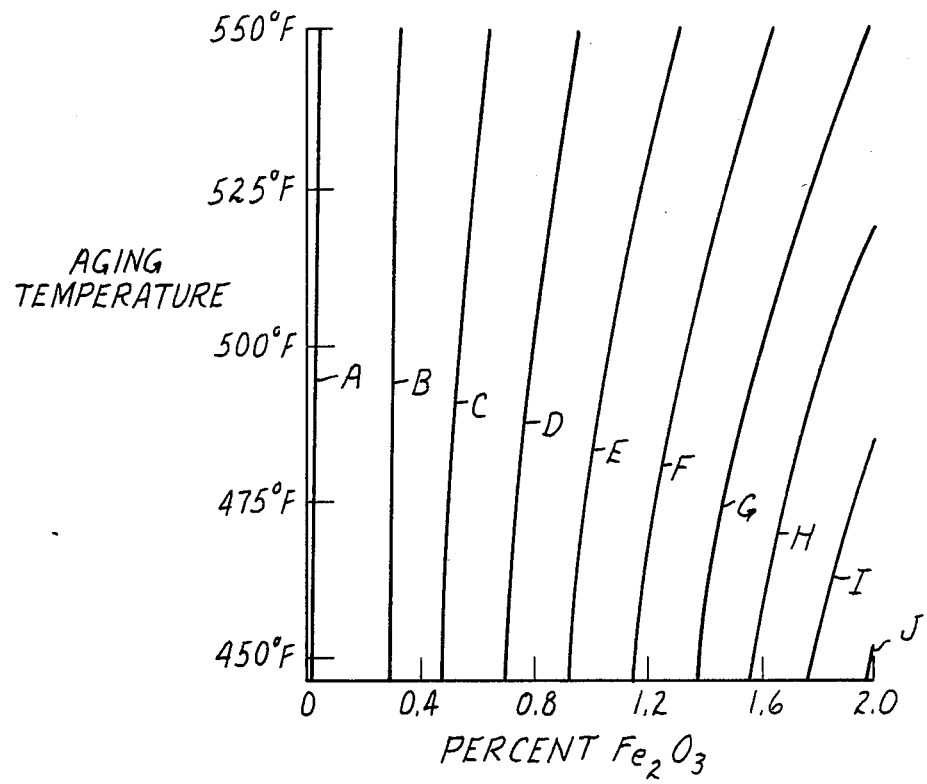
FIG. 1 shows the effect of mixing a chlorinated paraffin and different amounts of $Fe_2O_3$ in a particular asphalt, and of aging the resulting asphaltic compositions at different temperatures.

Halogen constitutes a substantial proportion, generally at least 40 weight-percent, of halogenated organic compounds useful in the invention. Halogen evolves from the compound, for example, as halogen vapor or hydrogen halide, when the compound is heated in the presence of an excess of iron oxide (i.e., more iron oxide than needed for stoichiometric reaction with the released halogen to form iron halide; the iron oxide catalyzes the decomposition of the halogenated organic compound) to a temperature less than 250° C. If the halogen were to evolve from the compound only at temperatures higher than 250° C., asphalt in which the compound was dispersed would flow significantly before catalyzed reaction of the asphalt limited the flow. On the other hand, the halogenated organic compound should not be so volatile or unstable that it will decompose when heated by itself to a temperature less than about 100° C., since that could lead to premature catalysis and increased viscosity of the asphalt in some processing operations, as well as possible handling and toxicity problems. The temperature at which halogen evolves from the halogenated organic compound is measured in an air atmosphere by a differential thermal analyzer (DTA) or differential scanning colorimeter (DSC). The specific instrument used for most measurements reported herein was a DTA made by E. I. du Pont de Nemours and Company, which used a Model 990 controller and a 1200° C. cell, a temperature scan rate of 10° C. per minute and a temperature range of 30° to 900° C., a scale of 0.8 millivolts per inch, aluminum oxide as the reference, and a platinum and platinum-rhodium (13 percent) thermocouple. This test measures the decomposition occurring over a rather short period of time. Decomposition of the halogenated organic compound varies with time and temperature, so that some decomposition of useful halogenated organic compounds can occur at less than 100° C. but at such a slow rate, or over such a long time period, that the decomposition does not prevent utility in the invention, but may even add utility, as when asphalt in roofing material is catalyzed to a thickened state in the heat of a hot summer day.

Linear aliphatic saturated halogenated compounds are preferred materials, and halogenated paraffins are especially useful; the latter are generally available as solid particles, liquids or aqueous suspensions. Other useful halogen donors are unstable forms of polyvinyl chloride and polyvinylidene chloride (instability can be achieved by omission of conventional stabilizers or by inclusion of materials like zinc compounds which promote decomposition). It is sometimes desirable to mix two or more kinds of halogenated organic compounds; for example, some varieties of halogenated paraffin decompose at a lower temperature than another variety and catalyze the decomposition of the other variety.

Useful iron-containing compounds may generally be chosen by heating a mixture of asphalt, chlorinated paraffin and the candidate material for one hour at 350° F. (177° C.); if the ring-and-ball softening point of the mixture after the test is higher than the ring-and-ball softening point for the asphalt itself, the iron-containing compound will generally be useful in the invention (a standard test for ring-and-ball softening point, such as described in ASTM E28-42T, is used). The preferred iron-containing compounds for use in the invention are iron oxide particles, i.e., particles of FeO, $Fe_2O_3$ or $Fe_3O_4$. Magnetic iron oxides have the advantage that magnetic forces sometimes can be used in applying the particles to a substrate, as by placing a magnet under the substrate. Other useful iron containing compounds include iron salts of a fatty acid such as stearic or oleic acid.

When both the halogenated organic compound and iron-containing compound are solid particles, they may be mixed and used as a particulate mixture. In another form, the two compounds are blended into granules, as by melting the halogenated organic compound, stirring in the iron-containing compound, and cooling and pulverizing the blend. Another form of granule is prepared by coating halogenated organic compound and iron-containing compound onto a filler particle such as hydrated aluminum, unexpanded vermiculite or perlite. Coatings on light-weight void-containing filler particles, such as expanded vermiculite or perlite particles or hollow glass microspheres, are especially useful. In one procedure, the filler particles are first coated with the halogenated organic compound from a solution, dispersion, or melt, and then, while still tacky, the coated particles are tumbled in the iron-containing particles, which form a nontacky outer surface on the granules. Alternatively, the filler particles are coated with a binder material such as polyethylene or asphalt; and while the binder material is tacky as by heating, the coated filler particles are tumbled in a particulate mixture of the halogenated compound and iron-containing compound.

Catalyst mixtures based on liquid forms of halogenated organic compounds have special value. In one useful product particles of $Fe_2O_3$ are mixed into an aqueous suspension of solid or liquid particles of halogenated paraffin. The resulting suspension or slurry is conveniently mixed into suspensions of asphalt in water, which are typically in an emulsified form.

A catalyst mixture of the invention can be incorporated into asphalt in a variety of ways: by mixing a particulate mixture, granules, or suspension into asphalt emulsions or otherwise liquefied asphalt; by cascading a particulate mixture or granules onto an asphalt layer; by incorporating a particulate mixture or granules into a fibrous substrate such as an organic felt (e.g., by incorporating the particulate mixture in a slurry from which the organic felt is prepared) or glass fiber mat (e.g., by incorporating the particulate mixture or granules in a binder material which is impregnated in the glass fiber mat), which is later impregnated or coated with asphalt. Similarly, a particle mixture or blended granules can be cascaded into a tacky coating carried on a film or substrate, which is later coated with asphalt.

Other materials are often included in the asphalt besides a catalyst mixture of the invention. Fillers such as limestone or clay, which reduce cost, are commonly used (the parts of asphalt referred to in this specification refer to the asphalt without filler). Rubber-based modifiers are also added to improve flexibility.

A small amount of catalyst provides sufficient catalysis of the asphalt to provide desired flame retardancy and flow control. Generally there is no need to use more than one part of halogenated organic compound per 100 parts of asphalt; and since the halogenated organic compound is usually the most expensive ingredient in a composition of the invention, it is preferred to use less than one-half part per 100 parts of asphalt. To achieve the desired catalysis, at least 0.1 part of halogenated organic compound is generally used per 100 parts of asphalt.

The iron-containing compound is typically used in excess to assure reaction with the halogen that evolves. At least one part is generally used for each part of halogenated organic compound. Usually there is no need to use more than 10 parts of iron-containing compound for each part of halogenated organic compound.

Asphalt-containing a catalyst mixture of the invention can be used for many purposes. For example, latently catalyzed lower-viscosity grades of asphalt, can be impregnated into various substrates, such as the organic felt or glass fiber mat of a roofing material, and catalyzed in place to increase their viscosity and restrict their flow, especially upon exposure to a flame. Use of lower-viscosity asphalt, or lower-softening-point asphalt reduces manufacturing costs, and the asphalt can be more highly filled, e.g., 70 to 75 percent, before the viscosity approaches that of a conventional 230° F. softening-point asphalt containing 60 percent filler. After the roofing material is installed, catalysis can occur on a bright sunny day, when the roofing material can reach a temperature of 180° F. (82° C.). Measurable catalysis has been found to occur over extended periods of time with temperatures of a catalyzed asphaltic composition of the invention as low as 150° F. (65° C.). However, the catalyst is still sufficiently latent that, even when the asphalt is at an elevated temperature, such as molten asphalt heated to 350° F., the catalyst can be added immediately before a coating operation without unduly thickening the asphalt to prevent a convenient coating operation.

Besides roofing material such as roofing shingles, sheet materials useful in membrane roofing systems can be prepared using asphalt compositions of the invention. In such manufacture, a substrate such as a fibrous substrate saturated with asphalt or a polymeric film is coated with asphalt and optionally covered with a layer of roofing granules. Similarly, roll roofing or underlayments, such as organic felts or glass fiber mats, can be saturated or coated with asphalt compositions of the invention.

In a different use, sheet material such as a fibrous web or a polymeric film saturated with or carrying a latently catalyzed asphaltic composition of the invention can be laminated to fibrous or foam insulation as a moisture and fire-retardant barrier. Such insulation boards can be prepared either for thermal or acoustic insulation purposes. Also, asphaltic compositions of the invention can be used separately from sheet material, for example, as sealants or caulks which can react after application to become more thick.

Asphalt compositions of the invention can be used in combination with the intumescable granules taught in application Ser. No. 59,614, now issued as U.S. Pat. No. 4,234,639, or with the granules taught in U.S. Pat. No. 4,218,502.

The invention will be further illustrated by the following examples.

EXAMPLE 1

Samples were prepared containing $Fe_2O_3$ in amounts ranging from 0 to 2.0 percent; 100 parts of a saturant asphalt having a ring-and-ball softening point of 151° F.; and 0.75 part of a chlorinated paraffin containing approximately 70 weight-percent chlorine (Chlorowax 70 supplied by Diamond-Shamrock Corporation). The ingredients of each sample were stirred together with a spatula, and the samples then aged for 10 minutes at various temperatures ranging from about 450° F. to 550° F. The ring-and-ball softening points of the sample asphaltic compositions were measured after the aging period, and the softening points were compiled and computer-plotted in a contour plot reproduced as FIG. 1 in the drawing. In that plot the curve labeled A is for a softening point of 160° F.; B is for 165° F.; C, 170° F.; D, 175° F.; E, 180° F.; F, 185° F.; G, 190° F.; H, 195° F.; I, 200° F.; and J, 205° F.

As the plotted results reveal, the presence of the catalyst mixture of the invention and aging of the samples at elevated temperature achieve significant increases in the softening point of the asphalt.

EXAMPLES 2 and 3

Figure 2:
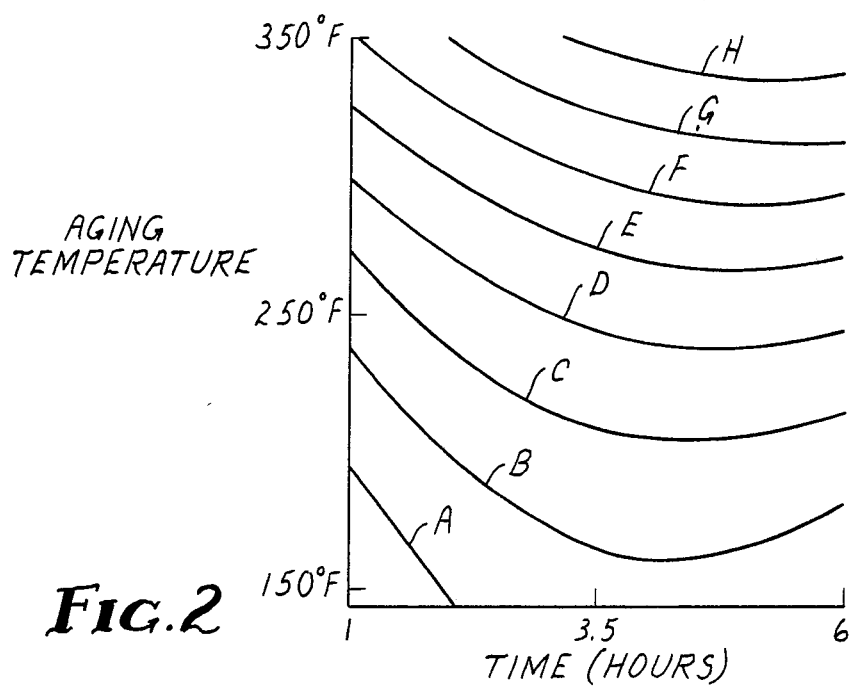
FIGS. 2 and 3 show the effect on two different asphalts of adding specified amounts of a catalyst mixture of the invention and aging the compositions at different temperatures and for different times.
Figure 3:
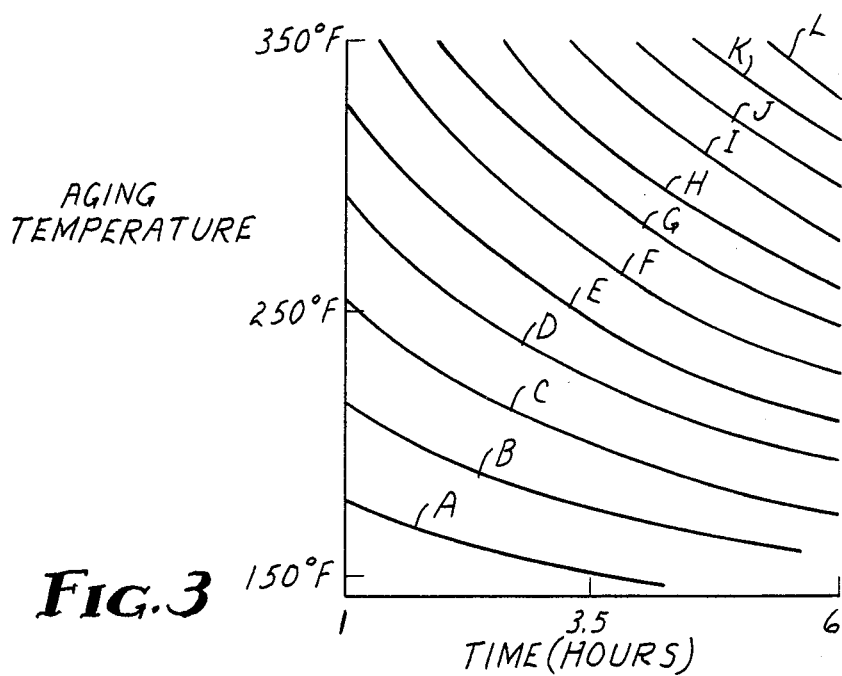

Two different kinds of asphalt, one having a softening point of 232° F. and the other a softening point of 180° F., each filled with 58 percent limestone filler, were catalyzed using 0.33 part of Chlorowax 70 and 0.75 part of $Fe_2O_3$ per 100 parts of the asphalt. Different samples were heated to different temperatures for different times, and the softening points of the asphalt then measured. The results were compiled and used to prepare computer plots reproduced as FIGS. 2 and 3 in the drawing. In FIG. 2, Curve A is for a softening point of 260° F.; B is for 270° F.; C, 280° F.; D, 290° F.; E, 300° F.; F, 310° F.; G, 320° F.; and H, 330° F. In FIG. 3, Curve A is for a softening point of 210° F.; Curve B is for 220° F.; C, 230° F.; D, 240° F.; E, 250° F.; F, 260° F.; G, 270° F.; H, 280° F.; I, 290° F.; J, 300° F.; K, 310° F.; and L, 320° F.

What is claimed is:

1. Composition comprising (a) 100 parts of asphalt, bitumen, or pitch; (b) 0.1 to 1 weight-part of a linear aliphatic saturated halogenated organic compound that (i) has a molecular weight of at least 300, (ii) includes halogen in an amount of at least 40 weight-percent, and (iii) decomposes to release halogen when heated by itself to a temperature greater than about 100° C. and when heated in the presence of an excess of iron oxide to a temperature less than about 250° C.; a and (c) at least 0.1 part of iron-containing compound adapted to react with said released halogen to form iron halide, whereby heating of the mixture causes catalysis of the asphalt, bitumen, or pitch to a more viscous state.

2. Composition of claim 1 in which the halogenated organic compound comprises a mixture of two or more kinds of halogenated organic compound.

3. Composition of claim 1 in which the halogenated organic compound comprises halogenated paraffin.

4. Composition of claim 1 or 3 in which the iron-containing compound comprises iron oxide.

5. Composition of claim 1 which includes particles of halogenated organic compound and particles of iron-containing compound.

6. Composition of claim 1 in which halogenated organic compound and iron-containing compound are present in the form of granules which include both halogenated organic compound and iron-containing compound.

7. Composition of claim 6 in which the granules comprise a lightweight void-containing filler particle coated with the halogenated organic compound and iron-containing compound.

8. Composition of claim 1 in which the asphalt and halogenated organic compound are present as suspensions in water.

9. Solid free-flowing mass of granules comprising filler particles coated with a mixture which comprises
    (a) one part of a linear aliphatic saturated halogenated organic compound that has a molecular weight of at least 300, includes halogen in an amount of at least 40 weight-percent, and decomposes to release halogen when heated by itself to a temperature greater than about 100° C. and when heated in the presence of an excess of iron oxide to a temperature less than about 250° C.; and
    (b) 1 to 10 parts of iron-containing compound adapted to react with said released halogen to form iron halide,
whereby when said granules are mixed into asphalt and the mixture of asphalt and granules is subsequently heated, the asphalt is catalyzed to a more viscous state.

10. Granules of claim 9 in which the halogenated organic compound comprises halogenated paraffin.

11. Granules of claim 9 or 10 in which the iron-containing compound comprises iron oxide.

12. An aqueous suspension of asphalt, bitumen, or pitch which further includes
   (a) a linear aliphatic saturated halogenated organic compound that has a molecular weight of at least 300, includes halogen in an amount of at least 40 weight-percent, and decomposes to release halogen when heated by itself to a temperature greater than about 100° C. and when heated in the presence of an excess of iron oxide to a temperature less than about 250° C.; and
   (b) for each part of halogenated organic compound, 1 to 10 parts of iron-containing compound adapted to react with said released halogen to form iron halide.

13. Suspension of claim 12 in which the halogenated organic compound comprises halogenated paraffin.

14. Suspension of claim 12 or 13 in which the iron-containing compound comprises iron oxide.

15. Aqueous suspension of claim 12 which comprises about 0.1 to 1 part of a linear aliphatic saturated halogenated organic compound per 100 parts of asphalt, bitumen, or pitch.

16. Method for flame-retarding asphalt, bitumen or pitch comprising adding to said asphalt, bitumen or pitch a catalyst that comprises
   (a) one part of a linear aliphatic saturated halogenated organic compound that has a molecular weight of at least 300, includes halogen in an amount of at least 40 weight-percent, and decomposes to release halogen when heated by itself to a temperature greater than about 100° C. and when heated in the presence of an excess of iron oxide to a temperature less than about 250° C.; and
   (b) 1 to 10 parts of iron-containing compound adapted to react with said released halogen to form iron halide,
whereby when the mixture is subsequently heated, the asphalt is catalyzed to a more viscous state.

17. Method of claim 16 in which the halogenated compound and iron-containing compound are added to the asphalt, bitumen, or pitch as granules.

18. Method of claim 17 in which individual granules comprise both halogenated compound and iron-containing compound.

19. Method of claim 16 in which the halogenated compound and iron-containing compound are added to the asphalt, bitumen, or pitch as an aqueous suspension.

20. Composition comprising asphalt, bitumen or pitch; a linear aliphatic saturated halogenated paraffin that (i) has a molecular weight of at least 300, (ii) includes halogen in an amount of at least 40 weight-percent, and (iii) decomposes to release halogen when heated by itself to a temperature greater than about 100° C. and when heated in the presence of an excess of iron oxide to a temperature less than about 250° C.; and an iron-containing compound adapted to react with said released halogen to form iron halide, whereby heating of the composition causes catalysis of the asphalt, bitumen or pitch to a more viscous state.

* * * * *